(12) United States Patent
Sone et al.

(10) Patent No.: US 6,838,526 B1
(45) Date of Patent: Jan. 4, 2005

(54) MODIFIED CONJUGATED DIENE POLYMER AND METHOD OF PRODUCING THE SAME AND RUBBER COMPOSITION

(75) Inventors: Takuo Sone, Tokyo (JP); Ryouji Tanaka, Tokyo (JP); Kouichirou Tani, Tokyo (JP); Iwakazu Hattori, Tokyo (JP); Hiroshi Akema, Tokyo (JP); Atsushi Nakayama, Tokyo (JP)

(73) Assignees: JSR Corporation, Tokyo (JP); Bridgestone Corporation, Tokyo (JP)

( * ) Notice: Subject to any disclaimer, the term of this patent is extended or adjusted under 35 U.S.C. 154(b) by 302 days.

(21) Appl. No.: 09/709,563

(22) Filed: Nov. 13, 2000

(30) Foreign Application Priority Data

Nov. 12, 1999 (JP) .......................................... 11-322368
Jul. 18, 2000 (JP) ....................................... 2000-217032

(51) Int. Cl.$^7$ ................................................. C08F 8/34
(52) U.S. Cl. ................................ 525/332.8; 525/332.9; 525/333.1; 525/333.2; 525/349; 525/351; 525/375; 525/383
(58) Field of Search .......................... 525/332.8, 332.9, 525/333.1, 333.2, 375, 383, 349, 351

(56) References Cited

U.S. PATENT DOCUMENTS

| | | | |
|---|---|---|---|
| 4,446,281 A | | 5/1984 | Takamatsu et al. |
| 4,513,110 A | | 4/1985 | Rader .......................... 524/432 |
| 4,983,685 A | * | 1/1991 | Aoshima et al. .......... 525/331.8 |
| 5,292,791 A | * | 3/1994 | Groepper et al. ............ 524/530 |
| 5,844,050 A | * | 12/1998 | Fukahori et al. ............. 525/351 |

FOREIGN PATENT DOCUMENTS

| | | |
|---|---|---|
| GB | 964185 | 7/1964 |
| JP | 37-8198 | 7/1962 |
| JP | 47-14729 | 5/1972 |
| JP | 62-1404 | 1/1987 |
| JP | 63-64444 | 12/1988 |
| JP | 1-16244 | 3/1989 |
| JP | 4-2601 | 1/1992 |
| JP | 6-211916 | 8/1994 |
| JP | 6-306113 | 11/1994 |
| JP | 8-73515 | 3/1996 |
| JP | 10-35633 | 2/1998 |
| JP | 10-306113 | 11/1998 |

OTHER PUBLICATIONS

Iwakazu Hattori, et al; "Chemical Modification of Neodymium High cis–1,4 Polybutadiene with Styreneoxide" Polymers for Advanced Technologies, Aug. 1, 1993, Chichester, Sussex, GB, vol. 4. No. 7, pp. 450–456.

"Functionalization of Elastomers by Reactive Mixing" Research Disclosure, GB, Industrial Opportunities LTD. Havant, No. 362, Jun. 1, 1994, pp. 308–312.

XP000396650 "Chemical Modification Of Neodymium High cis–1,4 Polybutadiene with Styreneoxide", vol. 4, No. 7 Aug. 7, 1993, pp. 451–456.

XP000461268 "Functionalization of Elastomers By Reactive Mixing", No. 362, Jun. 1, 1994, pp. 308–312.

* cited by examiner

*Primary Examiner*—Bernard Lipman
(74) *Attorney, Agent, or Firm*—Sughrue Mion, PLLC

(57) ABSTRACT

A novel modified conjugated diene polymer is obtained by polymerizing a conjugated diene compound with a specified catalyst consisting of components (a)–(c) and then reacting with at least one specified compound selected from the group consisting of components (d)–(l), and has a content of cis-1,4-bond of not less than 85% and a ratio of weight average molecular weight to number average molecular weight of not more than 4. And also, a rubber composition comprises the modified conjugated diene polymer a rubber ingredient.

4 Claims, 4 Drawing Sheets

MODIFIED CONJUGATED DIENE POLYMER AND METHOD OF PRODUCING THE SAME AND RUBBER COMPOSITION

BACKGROUND OF THE INVENTION

1. Filed of the Invention

This invention relates to modified conjugated diene polymers, and more particularly to a modified conjugated diene polymer obtained by polymerizing a conjugated diene compound(s) with a catalyst of a rare earth element compound and then subjecting the resulting polymer just after the polymerization to a modification or coupling reaction with a specified compound so as to interact with a rubber reinforcement such as carbon black or the like to improve a dispersibility of the rubber reinforcement into rubber ingredient and having excellent properties such as rebound resilience, wear resistance, mechanical properties and the like.

2. Description of Related Art

Heretofore, there have been proposed many polymerization catalysts for conjugated dienes, which play an industrially very important role. Particularly, many polymerization catalysts giving a high content of cis-1,4-bond have been studied and developed for providing conjugated diene polymers having high performances in the thermal and mechanical properties. For example, there are well-known composite catalyst systems containing a compound of a transition metal such as nickel, cobalt, titanium or the like as an essential component. Among them, some catalysts have industrially and widely been used as a polymerization catalyst of butadiene, isoprene or the like (see End. Ing. Chem., 48, 784(1956) and JP-B-37-8198).

On the other hand, a composite catalyst system comprising a rare earth metal compound and an organometal compound of an element of Group I–III has been studied and developed in order to attain a further higher content of cis-1,4-bond and an excellent polymerization activity, and also studies on a high stereospecific polymerization using the same have been actively conducted.

In JP-B-47-14729 is disclosed a catalyst system comprising a rare earth metal compound such as cerium octanoate or the like, an alkylaluminum hydride such as diisobutylalumium hydride or the like, a trialkyl aluminum and an aluminum halide such as ethylaluminum dichloride or the like. Particularly, there is a description that a catalyst activity is increased by maturating such a catalyst system in the presence of butadiene.

In JP-B-62-1404, JP-B-63-64444 and JP-B-1-16244 is proposed a method of enhancing the catalyst activity by increasing a solubility of a rare earth element compound in a polymerization solvent. And also, JP-B-4-2601 discloses that a catalyst system comprising a rare earth metal compound, trialkylaluminum or aluminum hydride, and an organic halogen derivative indicates a higher activity in the polymerization of 1,3-butadiene as compared with the conventional catalyst.

However, polymers obtained by using the conventional catalyst systems including the rare earth metal compound becomes wider in the molecular weight distribution and do not sufficiently improve the wear resistance and rebound resilience.

In JP-A-6-211916, JP-A-6-306113 and JP-A-8-73515 is reported that when a catalyst system consisting of a neodymium compound and methyl aluminoxane is used, a high polymerization activity is indicated and a conjugated diene polymer having a narrow molecular weight distribution is obtained.

However, in this polymerization method, it is required to use a greater amount of methyl aluminoxane as compared with the conventional catalyst system using the organoaluminum compound in order to hold the sufficient polymerization activity and obtain a polymer having a narrow molecular weight distribution. Furthermore, such a catalyst is expensive as compared with the usual organoaluminum compound and also the cold flow becomes large to cause a problem in the storage stability, so that it comes into problem in the practical use.

In order to solve these problems, JP-A-10-306113 and JP-A-10-35633 report that the cold flow can be controlled by modifying the conjugated diene polymer polymerized in the presence of the catalyst system using the methyl aluminoxane with a hetero three-membered compound, a halogenated metal compound, a metal carbonate or the like.

However, when the resulting conjugated diene polymer is used with carbon black to prepare a rubber composition, the interaction between such a polymer (rubber) and carbon black is insufficient and hence the dispersibility of carbon black into the resulting rubber composition is poor and the wear resistance and mechanical properties of a vulcanizate made from such a rubber composition are not obtained at a satisfactory level.

SUMMARY OF THE INVENTION

The inventors have made various studies and found out that when using a catalyst system comprising a rare earth metal compound, aluminoxane, an organoaluminum compound and a halogen-containing compound, the catalyst activity is sufficiently high even at a small amount of aluminoxane used and a conjugated diene polymer having a narrow molecular weight distribution is obtained, and also the interaction with carbon black is improved by reacting (modifying or coupling) with a specified compound after the polymerization to provide a rubber composition having excellent rebound resilience, mechanical properties, processability and wear resistance for a vulcanizate, and as a result the invention has been accomplished.

According to a first aspect of the invention, there is the provision of a modified conjugated diene polymer obtained by modifying or coupling a conjugated diene polymer with at least one compound selected from the group consisting of the following components (d), (e), (f), (g), (h), (i), (j), (k) and (l), and having a content of cis-1,4-bond in a conjugated diene portion of not less than 85% and a ratio of weight average molecular weight (Mw) to number average molecular weight (Mn) of not more than 4 as measured through a gel permeation chromatography:

Component (d): a quinone compound;
Component (e): a thiazole compound;
Component (f): a sulfenamide compound;
Component (g): a dithiocarbamate compound;
Component (h): a thiuram compound;
Component (i): a thioimide compound;
Component (j): an amine compound containing at least one epoxy group in its molecule;
Component (k): an imide compound;
Component (l): an aldehyde compound or thioaldehyde compound containing at least one amino group in its molecule.

According to a second aspect of the invention, there is the provision of a method of producing a modified conjugated diene polymer which comprises polymerizing a conjugated diene compound(s) with a catalyst consisting essentially of the following components (a), (b) and (c) and then modifying or coupling with at least one compound selected from the group consisting of the above components (d) to (l):

Component (a): a compound containing a rare earth element of atomic number 57–71 in the Periodic Table or a compound obtained by reacting the compound with a Lewis base;

Component (b): an aluminoxane and/or an organoaluminum compound represented by a general formula of $AlR^1R^2R^3$ (wherein $R^1$ and $R^2$ are the same or different and are a hydrocarbon group having a carbon number of 1–10 or a hydrogen atom, and $R^3$ is a hydrocarbon group having a carbon number of 1–10 provided that $R^3$ is the same as or different from $R^1$ or $R^2$);

Component (c): a halogen-containing compound.

According to a third aspect of the invention, there is the provision of a rubber composition comprising 20–120 parts by weight of carbon black based on 100 parts by weight of rubber ingredient consisting of 10–100% by weight of the above modified conjugated diene polymer and 90–0% by weight of at least one other rubber selected from the group consisting of natural rubber, synthetic isoprene rubber, butadiene rubber, styrene-butadiene rubber, ethylene-α-olefin copolymer rubber, ethylene-α-olefin-diene terpolymer rubber, acrylonitrile-butadiene copolymer rubber, chloroprene rubber and halogenated butyl rubber (provided that the modified conjugated diene rubber+the other rubber=100% by weight).

DESCRIPTION OF PREFERRED EMBODIMENTS

The component (a) used in the catalyst according to the invention is a compound containing a rare earth element of atomic number 57–71 in the Periodic Table (rare earth element containing compound) or a reaction product obtained by reacting the compound with a Lewis base. As the rare earth element, neodymium, praseodymium, cerium, lanthanum, gadolinium and the like or a mixture thereof are preferable, and neodymium is more favorable.

The rare earth element containing compound according to the invention is a carboxylate, an alkoxide, a β-diketone complex, a phosphate or a phosphite. Among them, the carboxylate and phosphate are preferable, and the carboxylate is more favorable.

The carboxylate of the rare earth element is represented by a general formula of $(R^5—CO_2)_3M$ (wherein M is a rare earth element of atomic number 57–71 in the Periodic Table, and $R^5$ is a hydrocarbon group having a carbon number of 1–20, preferably a saturated or unsaturated and straight-chain or branched-chain or cyclic hydrocarbon group, to a primary, secondary or tertiary carbon atom thereof is bonded a carboxyl group).

As the carboxylic acid, mention may be made of octanoic acid, 2-ethyl-hexanoic acid, oleic acid, stearic acid, benzoic acid, napthenic acid, versatic acid (trade name made by Shell Chemical Corporation, a carboxylic acid in which carboxyl group is bonded to a tertiary carbon atom) and the like. Among them, 2-ethyl-hexanoic acid, napthenic acid and versatic acid are preferable.

The alkoxide of the rare earth element is represented by a general formula of $(R^6O)_3M$ (wherein M is a rare earth element of atomic number 57–71 in the Periodic Table). As an example of alkoxy group represented by $R^6O$, mention may be made of 2-ethyl-hexylalkoxy group, oleylalkoxy group, stearylalkoxy group, phenoxy group, benzylalkoxy group and the like. Among them, 2-ethyl-hexylalkoxy group and benzylalkoxy group are preferable.

As the β-diketone complex of the rare earth element, mention may be made of acetylacetone complex, benzoylacetone complex, propionitrile acetone complex, valerylacetone complex, ethylacetylacetone complex and the like. Among them, acetylacetone complex and ethylacetylacetone complex are preferable.

As the phosphate or phosphite of the rare earth element, mention may be made of bis(2-ethylhexyl) phosphate, bis (1-methylheptyl) phosphate, bis(p-nonylphenyl) phosphate, bis(polyethylene glycol-p-nonylphenyl) phosphate, (1-methylheptyl)(2-ethylhexyl) phosphate, (2-ethylhexyl)(p-nonylphenyl) phosphate, 2-ethylhexyl, mono-2-ethylhexyl phosphonate, 2-ethylhexyl, mono-p-nonylphenyl phosphonate, bis(2-ethylhexyl) phosphite, bis(1-methylheptyl) phosphite, bis(p-nonylphenyl) phosphite, (1-methylheptyl)(2-ethylhexyl) phosphite, (2-ethylhexyl)(p-nonylphenyl) phosphite and the like of the rare earth element. Among them, bis(2-ethylhexyl) phosphate, bis(1-methylheptyl) phosphate, 2-ethylhexyl, mono-2-ethylhexyl phosphite and bis(2-ethylhexyl) phosphite are favorable.

Among the above compounds, phosphates of neodymium and carboxylates of neodymium are preferable, and carboxylates of neodymium such as neodymium 2-ethyl-hexanoate, neodymium versatate and the like are most preferable.

Lewis base is used for easily solubilizing the rare earth element containing compound or stably storing over a long time of period. In this case, Lewis base is used at a molar ratio of 0–30 mole, preferably 1–10 mole per 1 mole of the rare earth element as a mixture with the rare earth element containing compound or a product obtained by previously reacting both the compounds.

As Lewis base, mention may be made of acetylaccetone, tetrahydrofuran, pyridine, N,N-dimethylformamide, thiophene, diphenyl ether, triethylamine, an organophosphorus compound, and a monovalent or bivalent alcohol.

As the component (a), the above rare earth element containing compounds or reaction products obtained by reacting these compounds with Lewis base may be used alone or in admixture of two or more compounds.

The component (b) used in the catalyst according to the invention is an aluminoxane having a chemical structure shown by the following formula (I) or (II):

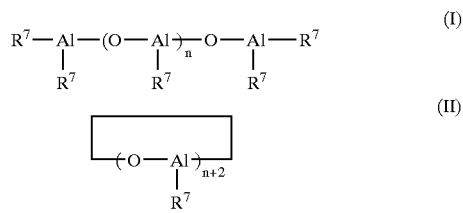

(wherein $R^7$s are the same or different and are a hydrocarbon group having a carbon number of 1–20, and n is an integer of not less than 2). And also, the component (b) may be an associated body of aluminoxanes shown in Fine Chemical, 23, (9), 5 (1994), J. Am. Chem. Soc., 115, 4971 (1993) and J. Am. Chem. Soc., 117, 6465 (1995).

In the aluminoxane represented by the formula (I) or (II); the hydrocarbon group represented by $R^7$ includes methyl group, ethyl group, propyl group, butyl group, isobutyl group, t-butyl group, hexyl group, isohexyl group, octyl group, isooctyl group and the like. Among them, methyl group, ethyl group, isobutyl group and t-butyl group are preferable, and methyl group is most preferable. And also, n is an integer of not less than 2, preferably 4–100.

As the aluminoxane, mention may be made of methylaluminoxane, ethylaluminoxane, n-propylaluminoxane, n-butylaluminoxane, isobutylaluminoxane, t-butylaluminoxane, hexylaluminoxane, isohexylaluminoxane and the like.

The production of the aluminoxane may be carried out by any well-known techniques. For example, an aluminoxane can be produced by adding trialkylaluminum or dialkylaluminum monochloride to an organic solvent such as benzene, toluene, xylene or the like and then adding and reacting water, steam, steam-containing nitrogen gas, or a salt having water of crystallization such as copper sulfate pentahydrate, aluminum sulfate hexadecahydrate or the like thereto.

As the component (b), the above aluminoxanes may be used alone or in an admixture thereof.

Another component (b) used in the catalyst according to the invention is an organoaluminum compound represented by the general formula of $AlR^1R^2R^3$ (wherein $R^1$ and $R^2$ are the same or different and are a hydrocarbon group having a carbon number of 1–10 or a hydrogen atom, and $R^3$ is a hydrocarbon group having a carbon number of 1–10 provided that $R^3$ is the same as or different from $R^1$ or $R^2$), which includes, for example, trimethylaluminum, triethylaluminum, tri-n-propylaluminum, tri-isopropylaluminum, tri-n-butylaluminum, tri-isobutylaluminum, tri-t-butylaluminum, tripentylaluminum, trihexylaluminum, tricyclohexyl-aluminum, trioctylaluminum, diethylaluminum hydride, di-n-propylaluminum hydride, di-n-butylaluminum hydride, di-isobutylaluminum hydride, dihexylaluminum hydride, di-isohexylaluminum hydride, di-isooctylaluminum hydride, ethylaluminum dihydride, n-propylaluminum dihydride, isobutylaluminum dihydride and the like. Among them, triethylaluminum, tri-isobutylaluminum, diethylaluminum hydride and di-isobutylaluminum hydride are preferable.

The above organoaluminum compounds as the component (b) may be used alone or in admixture of two or more compounds.

The aluminoxanes or the organoaluminum compounds corresponding to $AlR^1R^2R^3$ as the component (b) may be used alone or together. Particularly, it is favorable to use the aluminoxane and the organoaluminum compound together.

The component (c) used in the catalyst according to the invention is a halogen containing compound, which includes a reaction product between a halide of a metal belonging to Group 1, Group 2 or Group 7 and a Lewis base, diethylaluminum chloride, silicon tetrachloride, trimethylchlorosilane, methyl dichlorosilane, dimethyl dichlorosilane, methyl trichlorosilane, ethylaluminum dichloride, ethylaluminum sesqichloride, tin tetrachloride, tin dichloride, phosphorus trichloride, benzoyl chloride, t-butyl chloride and the like. Particularly, the reaction product between the metal chloride and the Lewis base is preferable.

As the metal halide, mention may be made of beryllium chloride, beryllium bromide, beryllium iodide, magnesium chloride, magnesium bromide, magnesium iodide, calcium chloride, calcium bromide, calcium iodide, barium chloride, barium bromide, barium iodide, zinc chloride, zinc bromide, zinc iodide, cadmium chloride, cadmium bromide, cadmium iodide, mercury chloride, mercury bromide, mercury iodide, manganese chloride, manganese bromide, manganese iodide, rhenium chloride, rhenium bromide, rhenium iodide, copper chloride, copper bromide, copper iodide, silver chloride, silver bromide, silver iodide, gold chloride, gold bromide, gold iodide and the like. Among them, magnesium chloride, calcium chloride, barium chloride, manganese chloride, zinc chloride and copper chloride are preferable, and magnesium chloride, manganese chloride, zinc chloride and copper chloride are most preferable.

As the Lewis base used for the formation of the reaction product with the metal halide, a phosphorus compound, a carbonyl compound, a nitrogen compound, an ether compound, an alcohol and the like are preferable. Concretely, they include tributyl phosphate, tri-2-ethylhexyl phosphate, triphenyl phosphate, tricresyl phosphate, triethyl phosphine, tributyl phosphine, triphenyl phosphine, diethylphosiphino ethane, diphenylphosphino ethane, acetylacetone, benzoylacetone, propionitrile acetone, valeryl acetone, ethylacetyl acetone, methyl acetoacetate, ethyl acetoacetate, phenyl acetoacetate, dimethyl malonate, diethyl malonate, diphenyl malonate, acetic acid, octanoic acid, 2-ethyl-hexanoic acid, oleic acid, stearic acid, benzoic acid, naphthenic acid, versatic acid (trade name, made by Shell Chemical Corp., which is a carboxylic acid having a carboxyl group bonded to a tertiary carbon atom), triethylamine, N,N-dimethyl acetoamide, tetrahydrofuran, diphenyl ether, 2-ethylhexyl alcohol, oleyl alcohol, stearyl alcohol, phenol, benzyl alcohol, 1-decanol, lauryl alcohol and the like. Among them, tri-2-ethylhexyl phosphate, tricresyl phosphate, acetylacetone, 2-ethylhexanoic acid, versatic acid, 2-ethylhexyl alcohol, 1-decanol and lauryl alcohol are preferable.

The above Lewis base is reacted at a rate of 0.01–30 mol, preferably 0.5–10 mol per 1 mol of the metal halide. By using the reaction product between the metal halide and the Lewis base can be reduced metal retaining in the polymer.

The amount of each component or composition ratio in the catalyst according to the invention is set to a given value in accordance with the use purpose or necessity.

In this connection, the component (a) is preferable to be used in an amount of 0.00001–1.0 mmol per 100 g of the conjugated diene compound. When the amount is less than 0.00001 mmol, the polymerization activity undesirably lowers, while when it exceeds 1.0 mmol, the catalyst concentration becomes undesirably high and the step of removing ash is required. Preferably, the component (a) is used in an amount of 0.0001–0.5 mmol.

In general, the amount of the component (b) used can be represented by a molar ratio of Al to the component (a). The molar ratio of component (a) to component (b) is 1:1–1:1,000, preferably 1:3–1:750, more particularly 1:5–1:500.

Further, a molar ratio of component (a) to component (c) is 1:0.1–1:30, preferably 1:0.2–1:15.

If the component amount or molar ratio of the components is outside the above defined range, the resulting catalyst does not act as a high activity catalyst or the step of removing a catalyst residue is undesirably required. Moreover, the polymerization reaction may be carried out by coexisting a hydrogen gas together with the above components (a)–(c) for the purpose of adjusting the molecular weight of the polymer.

In addition to the above components (a) to (c), a conjugated diene compound and/or a non-conjugated diene compound may be added in an amount of 0–1,000 mol per 1 mol of the compound as a component (a), if necessary. As the conjugated diene compound used in the production of the catalyst, use may be made of the same monomer as used in the polymerization such as 1,3-butadiene, isoprene and the like. As the non-conjugated diene compound, mention may be made of divinylbenzene, diisopropenyl benzene, triisopropenyl benzene, 1,4-vinylhexadiene, ethylidene norbornene and the like. The conjugated diene compound as a catalyst component is not essential, but provides a merit of more improving the catalyst activity when it is used together with the components (a)–(c).

The catalyst according to the invention is produced, for example, by reacting the components (a)–(c) dissolved in a solvent or further with the conjugated diene compound and/or non-conjugated diene compound, if necessary. In this case, the addition order of these components is optional. It is favorable that these components are previously mixed and reacted and then maturated from a viewpoint of the improvement of polymerization activity and the shortening of polymerization induction period. The maturating temperature is 0–100° C., preferably 20–80° C. When the temperature is lower than 0° C., the sufficient maturation is not conducted, while when it exceeds 100° C., the catalyst activity lowers and the broadening of molecular weight distribution is undesirably caused. The maturating time is not particularly restricted, but is usually not less than 0.5 minute. The maturation may be conducted by contacting the components with each other in a line before the addition to a polymerization reaction vessel and is stable over several days.

In the invention, the conjugated diene compound(s) is polymerized with the catalyst consisting essentially of the above components (a)–(c).

As the conjugated diene compound polymerizable by the catalyst according to the invention, mention may be made of 1,3-butadiene, 2-methyl-1,3-butadiene (isoprene), 2,3-dimethyl-1,3-butadiene, 1,3-pentadiene, 1,3-hexadiene, myrcene, cyclo-1,3-pentadiene and the like. Among them, 1,3-butadiene, isoprene and 1,3-pentadiene are favorable. These conjugated diene compounds may be used alone or in admixture of two or more compounds. Moreover, a copolymer is obtained when using a mixture of these compounds.

The polymerization of the conjugated diene compound according to the invention may be carried out in the absence of a solvent or by using a polymerization solvent.

The solvent for the polymerization is an inert organic solvent, which includes, for example, a saturated aliphatic hydrocarbon having a carbon number of 4–10 such as butane, pentane, hexane, heptane or the like; a saturated alicyclic hydrocarbon having a carbon number of 6–20 such as cyclopentane, cyclohexane or the like; a monoolefin such as 1-butene, 2-butene or the like; an aromatic hydrocarbon such as benzene, toluene, xylene or the like; and a halogenated hydrocarbon such as methylene chloride, chloroform, carbon tetrachloride, trichloroethylene, perchloroethylene, 1,2-dichloroethane, chlorobenzene, bromobenzene, chlorotoluene or the like.

These polymerization solvents may be used alone or in admixture of tow or more solvents.

The polymerization temperature is usually −30° C.−+200° C., preferably 0–150° C. The polymerization reaction may be batch type or continuous type.

In order to deactivate the catalyst of the rare earth element containing compound according to the invention and the resulting polymer in the production of the polymer, it is necessary to prevent the incorporation of a compound having a deactivation action such as oxygen, water, carbon dioxide gas or the like into the polymerization system as far as possible.

In the invention, after the conjugated diene compound is polymerized by using the catalyst of the rare earth element containing compound, at least one compound selected from the group consisting of the above components (d)–(l) is subsequently added to an active terminal of the resulting living polymer, whereby the active terminal of the polymer is reacted (modified or coupled) with the compound having a specified functional group to form a novel polymer having an increased polymer molecular weight or a branched polymer chain and an improved interaction with carbon black.

By such a reaction (modifying or coupling) are improved the rebound resilience, wear resistance, mechanical properties and cold flow in addition to the interaction with carbon black.

In the invention, the component (d) to be reacted with the active terminal of the polymer is a quinone compound.

As the component (d), mention may be made of 1,4-benzoquinone, 1,4-naphthoquinone, anthraquinone, 2-methyl1,4-benzoquinone, 2,3-dimethyl-1,4-benzoquinone, 2,5-dimethyl-1,4-benzoquinone, 2,6-dimethyl-1,4-benzoquinone, 2-t-butyl-1,4-benzoquinone, 2,5-di-t-butyl-1,4-benzoquinone, 2,3-dichloro-1,4-benzoquinone, 2,5-dichloro-1,4-benzoquinone, 2,6-dichloro-1,4-benzoquinone, 2,5-dibromo-1,4-benzoquinone, chloranil, bromanil, chloranilic acid, bromanilic acid, 2-methyl-1,4-naphthoquinone, 2,3-dimethyl-1,4-naphthoquinone, 2-chloro-1,4-naphthoquinone, 2,3-dichloro-1,4-naphthoquinone, 2,3-dibromo-1,4-naphthoquinone, 1,5-dichloroanthraquinone, 1,8-dichloroanthraquinone, 1,4,8,11-tetrachloroanthraquinone and the like.

The components (d) mat be used alone or in admixture of two or more compounds.

The component (e) to be reacted with the active terminal of the polymer is a thiazole compound, which includes, for example, mercaptobenzothiazole, dibenzothiazole disulfide, 2-(4-morpholinodithio) benzothiazole, 2-(2,4-dinitrophenyl) mercaptobenzothiazole, mercaptobenzothiazole cyclohexylamine salt, N,N'-diethylthiocarbamoyl-2-benzothiazole sulfide and the like.

The components (e) may be used alone or in admixture of two or more compounds.

The component (f) to be reacted with the active terminal of the polymer is a sulfenamide compound.

As the component (f), mention may be made of N-t-butyl-2-benzothiazolyl sulfenamide, N-cyclohexyl-2-benzothiazolyl sulfenamide, N,N'-dicyclohexyl-2-benzothiazolyl sulfenamide, N-oxydiethylene-2-benzothiazolyl sulfenamide and the like.

The components (f) may be used alone or in admixture of two or more compounds.

The component (g) to be reacted with the active terminal of the polymer is a dithiocarbamate compound.

As the component (g), mention may be made of diethyldithio-carbamic acid 2-benzothiazoyl ester, piperidine pentamethylene dithiocarbamate, pipecoline dithiocarbamate and the like.

The components (g) may be used alone or in admixture of two or more compounds.

The component (h) to be reacted with the active terminal of the polymer is a thiuram compound.

As the component (h), mention may be made of tetramethylthiuram disulfide, tetraethylthiuram disulfide, tetrabutylthiuram disulfide, tetramethylenethiuram monosulfide, dipentamethylenethiuram tetrasulfide and the like.

The components (h) may be used alone or in admixture of two or more compounds.

The component (i) to be reacted with the active terminal of the polymer is a thioimide compound, which includes, for example, N-(cyclohexylthio) phthalimide, N-(phenylthio) phthalimide and the like.

The components (i) may be used alone or in admixture of two or more compounds.

The component (j) to be reacted with the active terminal of the polymer is an amine compound having at least one epoxy group in its molecule.

As the component (j), mention may be made of N,N-diglycidylaniline, N,N-diglycidyl-o-toluidine, N,N-diglycidyl-(4-glycidyloxy) aniline, N,N-diglycidyl-(2-glycidyloxy) aniline, N,N,N',N'-tetraglycidylamino diphenylmethane, trisepoxypropyl isocyanurate, N-glycidyl-dibutylamine, N-glycidylpyrolidine, N-glycidylpiperidine, N-glycidylhexamethyleneimine, N-glycidylmorpholine, N,N'-diglycidylpiperadine, N,N'-diglycidyl homopiperadine, N-glycidyl-N'-methylpiperadine, N-glycidyl-N'-benzylpiperadine, 2-diglycidylaminoethyl-N-methylpyrolidine and the like.

The components (j) may be used alone or in admixture of two or more compounds.

The component (k) to be reacted with the active terminal of the polymer is an imide compound, which includes, for example, N-methylmaleimide, N-cyclohexylmaleimide, N-laurylmaleimide, N-phenylmaleimide, N-chlorophenylmaleimide, N-benzylmaleimide, N-methylphthalimide, N-benzylphthalimide, N,N-o-phenylene bismaleimide, N,N-m-phenylene bismaleimide, N,N-p-phenylene bismaleimide and the like.

The components (k) may be used alone or in admixture of two or more compounds.

The component (l) to be reacted with the active terminal of the polymer is an aldehyde compound or a thioaldehyde compound having at least one amino group in its molecule.

As the component (l), mention may be made of 4-dimethylamino benzaldehyde, 4-diphenylamino benzaldehyde, 4-divinylamino benzaldehyde and the like and thioaldehyde compounds corresponding thereto.

The components (l) may be used alone or in admixture of two or more compounds.

The components (d)–(l) (hereinafter referred to as a modifying agent) may be used alone or in admixture of two or more components. Particularly, the components (d), (e), (h), (i) and (k) are preferable as the modifying agent, and the components (e) and (k) are most favorable.

The amount of the modifying agent used to the component (a) is 0.01–200, preferably 0.1–150 as a molar ratio. When the amount is less than 0.01, the reaction does not sufficiently proceed and the dispersibility of carbon black is not sufficiently developed and the effect of improving the rebound resilience, wear resistance and cold flow is not developed, while when it exceeds 200, the dispersibility of carbon black and the effect of improving the properties are saturated from a viewpoint of economical reason, and an insoluble matter in toluene (gel) is undesirably created according to occasions.

It is desirable that the modification or coupling reaction (hereinafter referred to as a modification reaction) is carried out at a temperature of not higher than 160° C., preferably −30° C.–+130° C. for 0.1–10 hours, preferably 0.2–5 hours.

After the modification reaction, an objective polymer can be recovered by adding a short-stop and a polymerization stabilizer to the reaction system, if necessary, and conducting well-known solvent-removing and drying operations in the production of the conjugated diene polymer.

The modified conjugated diene polymer obtained after the modification has a cis-1,4-bond content of not less than 85%, preferably not less than 90%, more preferably not less than 93% and a ratio of weight average molecular weight (Mw)/number average molecular weight (Mn) of not more than 4, preferably not more than 3.5. When the cis-1,4-bond content is less than 85%, the wear resistance is poor. And also, when the ratio Mw/Mn exceeds 4, the wear resistance is poor.

Moreover, the modified conjugated diene polymer has a 1,2-vinyl bond content of not more than 2.5%, preferably not more than 2.0%. When the 1,2-vinyl bond content exceeds 2.5%, the durability tends to be poor.

Further, the modified conjugated diene polymer is favorable to have a Mooney viscosity ($ML_{1+4}$, 100° C.) of 10–150. When the Mooney viscosity is less than 10, the wear resistance after vulcanization becomes poor, while when it exceeds 150, the processability in the kneading may become poor.

Furthermore, the weight average molecular weight of the modified conjugated diene polymer as converted by polystyrene is usually 100,000–1,50,000, preferably 150,000–1,000,000. When the weight average molecular weight is outside the above range, the processability and vulcanization properties become undesirably poor.

The thus modified conjugated diene polymer can be recovered by solvent-removing and drying operations after a process oil such as aromatic oil, naphthenic oil or the like is added prior to the removal of the solvent, if necessary.

The modified conjugated diene polymer(s) according to the invention is used in applications requiring mechanical properties and wear resistance such as tread and sidewall in tires for passenger car, truck and bus and winter-season tires such as studless tire or the like, various rubber members, hoses, belts, vibration damping rubbers, various industrial goods and the like by using the polymer alone or blending with another synthetic rubber or natural rubber, extending with a process oil, if necessary, and adding with a filler such as carbon black or the like, a vulcanizing agent, a vulcanization accelerator and the other usual additives and then kneading and vulcanizing them. As the synthetic rubber, use may be made of synthetic isoprene rubber, butadiene rubber, styrene-butadiene rubber, ethylene-α-olefin copolymer rubber, ethylene-α-olefin-diene terpolymer rubber, acrylonitrile-butadiene copolymer rubber, chloroprene rubber, halogenated butyl rubber, hydrogenated butadiene rubber, hydrogenated styrene-butadiene rubber and the like.

In the invention, the modified conjugated diene polymer and the other rubber are blended such that the modified conjugated diene polymer is 10–100% by weight, preferably 20–100% by weight and the other rubber is 90–0% by weight, preferably 80–0% by weight, provided that the modified conjugated diene polymer+other rubber=100% by weight. When the amount of the modified conjugated diene polymer according to the invention is less than 10% by weight, the dispersibility of carbon black is insufficient and the properties such as rebound resilience, wear resistance and strength at break are poor.

In the modified conjugated diene polymer according to the invention, the modification or coupling is carried out with the above compound having the specified functional group, so that such a functional group is bonded to various functional groups existing on a surface of a rubber reinforcement such as carbon black or the like in the formation of the rubber composition to develop the interaction between the rubber reinforcement and rubber, whereby the dispersibility of the rubber reinforcement such as carbon black or the like in the rubber composition is improved.

The rubber composition according to the invention is obtained by using the modified conjugated diene polymer according to the invention alone or blending with the other synthetic rubber or natural rubber as rubber ingredient, compounding with a process oil, if necessary, and then adding with carbon black as a filler and usual additives such as a vulcanizing agent, a vulcanization accelerator and the like.

In order to develop the excellent characteristics of the modified conjugated diene polymer according to the invention, such a polymer is included into rubber ingredient in an amount of not less than 10% by weight, preferably not less than 20% by weight.

As the process oil used in the compounding or oil-extending, mention may be made of paraffinic, napthenic and aromatic oils. The amount of the process oil used is not more than 80 parts by weight, preferably 20–60 parts by weight per 100 parts by weight of the rubber ingredient.

In the rubber composition according to the invention, carbon blacks of HAF, ISAF, SAF and the like are used, and particularly a carbon black having an iodine adsorption (IA) of not less than 60 mg/g and a dibutylphthalate adsorption (DBP) of not less than 80 ml/100 g is used.

The amount of the carbon black compounded as a rubber reinforcement is 20–120 parts by weight, preferably 30–100 parts by weight, more particularly 40–80 parts by weight per 100 parts by weight of the rubber ingredient. When the amount is less than 20 parts by weight, the reinforcing property is poor and the effect of improving the rebound resilience, wear resistance and strength at break is not obtained, while when it exceeds 120 parts by weight, the viscosity of the uncured rubber composition rises and the processability is poor and also the wear resistance and rebound resilience become poor.

In the rubber composition according to the invention, sulfur is usually used as a vulcanizing agent in an amount of 0.1–3 parts by weight, preferably 0.5–2 parts by weight per 100 parts by weight of the rubber ingredient.

As a vulcanization aid and a processing aid is generally used stearic acid, an amount of which is 0.5–5 parts by weight per 100 parts by weight of the rubber ingredient.

The vulcanization accelerator is not particularly restricted, but a thiazole based vulcanization accelerator such as M (2-mercaptobenzothiazole), DM (dibenzothiazyl disulfide), CZ (N-cyclohexyl-2-benzothiazyl sulfenamide) or the like may be preferably mentioned. The amount used is usually 0.1–5 parts by weight, preferably 0.2–3 parts by weight per 100 parts by weight of the rubber ingredient.

The rubber composition according to the invention may be compounded with a filler such as silica, calcium carbonate, titanium oxide or the like other than the above rubber reinforcement, and additives such as zinc oxide, an antioxidant, an antiozonant and the like, if necessary.

The rubber composition according to the invention is obtained by kneading in a kneading machine such as rolls, internal mixer or the like and shaped and vulcanized, which can be used in not only tire applications such as tire tread, under tread, carcass, sidewall, bead portion and the like but also applications such as hoses, belts, shoe bottoms, window frames, sealing materials, vibration damping rubbers and other industrial goods. Preferably, the above rubber composition is used as a rubber for a tire tread.

BRIEF DESCRIPTION OF THE DRAWINGS

The invention will be described with reference to the accompanying drawings, wherein.

The following examples are given in illustration of the invention and are not intended as limitations thereof.

In these examples, part and % are by weight unless otherwise specified. And also, various measurements in these examples are conducted according to the following methods.

Mooney Viscosity ($ML_{1+4}$, 100° C.)

It is measured at a temperature of 100° C. for a measuring time of 4 minutes after the preliminary heating for 1 minute according to a method of JIS K6300-1994.

Number Average Molecular Weight (Mn), Weight Average Molecular Weight (Mw)

It is measured by using HLC-8120GPC made by Toso Co., ltd. and a differential refractometer and a ultraviolet visible meter as a detector under the following conditions:

Column: column GMHHXL made by Toso Co., Ltd.

Mobile phase: tetrahydrofuran

Microstructure (cis-1,4-bond Content, vinyl-1,2-bond Content)

It is measured by an infrared ray method (Morero's method).

Tensile Properties

A tensile stress at 300% elongation (M300%), elongation at break (EB) and tenacity at break (TB) are measured according to a method of JIS K6301-1995.

Wear Resistance

It is measured at a slip ratio of 60% and room temperature (25° C.) by using a Lambourn abrasion tester (made by Shimada Giken Co., Ltd.). tan δ

It is measured at a strain of 3% and 50° C. by using a mechanical spectrometer made by Rheometrics Corp.

Rebound Resilience

It is measured at 50° C. by using a rebound resilience tester made by Dunlop Corp.

EXAMPLE 1

Into an autoclave of 5 liter in capacity purged with nitrogen are charged 2.4 kg of cyclohexane and 300 g of 1,3-butadiene in a nitrogen atmosphere. Into the resulting mixture is charged a catalyst obtained by previously mixing a cyclohexane solution of neodymium versatate (hereinafter abbreviated as $Nd(ver)_3$) (0.09 mmol), a toluene solution of methyl-aluminoxane (hereinafter abbreviated as MAO) (7.2 mmol), hydrogenated diisobutylaluminum (hereinafter abbreviated as $AliBu_2H$) (3.6 mmol) and a toluene solution of a diethylaluminum chloride (hereinafter abbreviated as DEAC) (0.18 mmol) as a catalyst component and maturating them with an amount of 1,3-butadiene corresponding to 5 times of neodymium amount at 50° C. for 30 minutes to conduct polymerization at 80° C. for 60 minutes. The reaction conversion of 1,3-butadiene is approximately 100%.

Then, the resulting polymer solution is kept at a temperature of 50° C. and added and reacted with 2,3-dichloro-1, 4-naphthoquinone (4.5 mmol) for 30 minutes. Thereafter, a methanol solution containing 1.5 g of 2,4-di-t-butyl-p-cresol is added to stop polymerization, which is desolvated by steam stripping and dried on a roll at 110° C. to obtain a polymer. The polymerization conditions and analytical results are shown in Table 1.

Figure 1A:
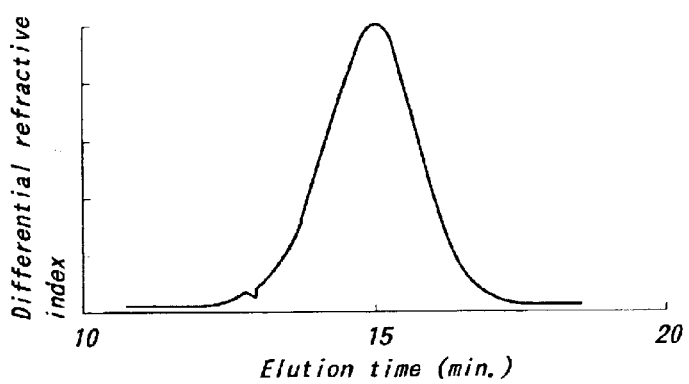
FIG. 1 is a GPC chart of a polymer obtained in Example 1 before modification.
Figure 1B:
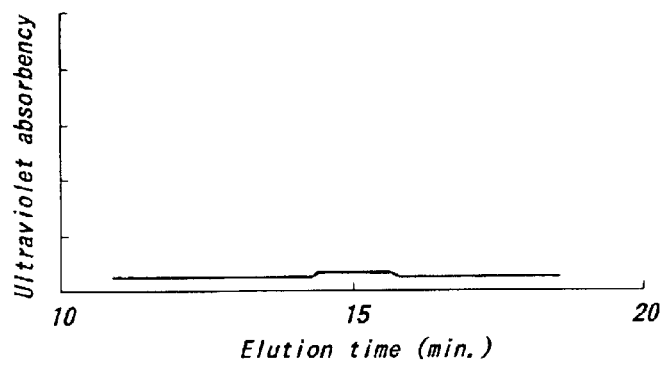
Figure 2A:
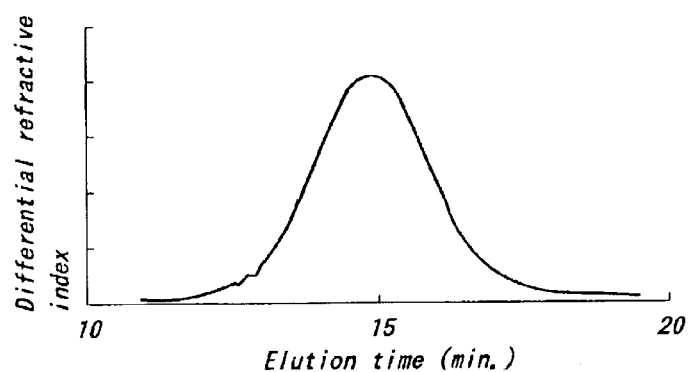
FIG. 2 is a GPC chart of a polymer obtained in Example 1 after modification.
Figure 2B:
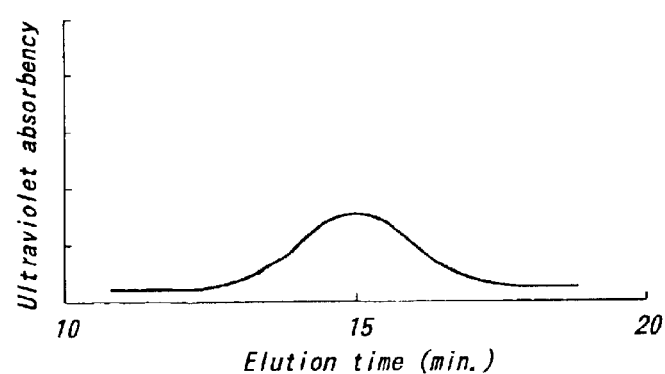

And also, a GPC chart of a polymer before the addition of 2,3-dichloro-1,4-naphthoquinone is shown in FIG. 1 and a GPC chart of a polymer after the addition is shown in FIG. 2. As seen from FIGS. 1 and 2, a peak is not observed by the ultraviolet visible meter before the addition of 2,3-dichloro-1,4-naphthoquinone, but a peak is observed after the addition. This shows that the polymer is modified with 2,3-dichloro-1,4-naphthoquinone.

EXAMPLE 2

A polymer is obtained in the same manner as in Example 1 except that 2-(4-morpholinodithio) benzothiazole is used instead of 2,3-dichloro-1,4-naphthoquinone. The polymerization conditions and analytical results are shown in Table 1.

EXAMPLE 3

A polymer is obtained in the same manner as in Example 1 except that N-oxydiethylene-2-benzothiazole sulfenamide is used instead of 2,3-dichloro-1,4-naphthoquinone. The polymerization conditions and analytical results are shown in Table 1.

EXAMPLE 4

A polymer is obtained in the same manner as in Example 1 except that diethyldithiocarbamic acid 2-benzothiazoyl ester is used instead of 2,3-dichloro-1,4-naphthoquinone. The polymerization conditions and analytical results are shown in Table 1.

EXAMPLE 5

A polymer is obtained in the same manner as in Example 1 except that tetramethylthiuram disulfide is used instead of 2,3-dichloro-1,4-naphthoquinone. The polymerization conditions and analytical results are shown in Table 1.

EXAMPLE 6

A polymer is obtained in the same manner as in Example 1 except that N-(cyclohexylthio) phthalimide is used instead of 2,3-dichloro-1,4-naphthoquinone. The polymerization conditions and analytical results are shown in Table 1.

EXAMPLE 7

Into an autoclave of 5 liter in capacity purged with nitrogen are charged 2.4 kg of cyclohexane and 300 g of 1,3-butadiene in a nitrogen atmosphere. Into the resulting mixture is charged a catalyst obtained by previously mixing a cyclohexane solution of neodymium versatate (0.37 mmol), a toluene solution of triisobutylaluminum (hereinafter abbreviated as AliBu$_3$) (11.1 mmol), hydrogenated diisobutylaluminum (3.6 mmol) and a toluene solution of diethylaluminum chloride (0.74 mmol) and maturating them with an amount of 1,3-butadiene corresponding to 5 times of neodymium amount at 50° C. for 30 minutes to conduct polymerization at 80° C. for 60 minutes. The reaction conversion of 1,3-butadiene is approximately 100%.

Then, the resulting polymer solution is kept at a temperature of 50° C. and added and reacted with 2,3-dichloro-1,4-naphthoquinone (4.5 mmol) for 30 minutes. Thereafter, a methanol solution containing 1.5 g of 2,4-di-t-butyl-p-cresol is added to stop polymerization, which is desolvated by steam stripping and dried on a roll at 110° C. to obtain a polymer. The polymerization conditions and analytical results are shown in Table 1.

Figure 3A:
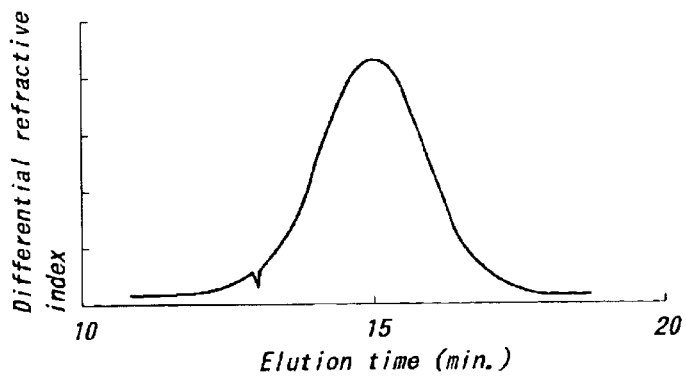
FIG. 3 is a GPC chart of a polymer obtained in Example 7 before modification.
Figure 3B:
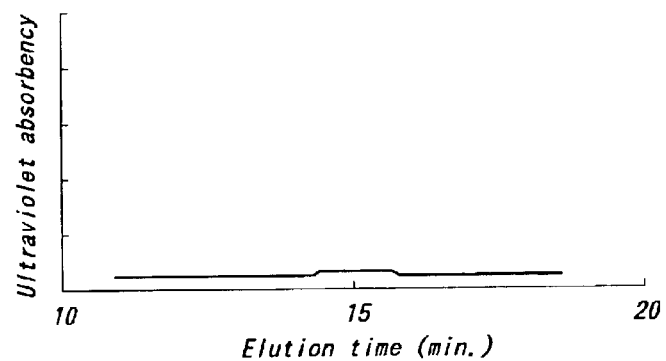
Figure 4A:
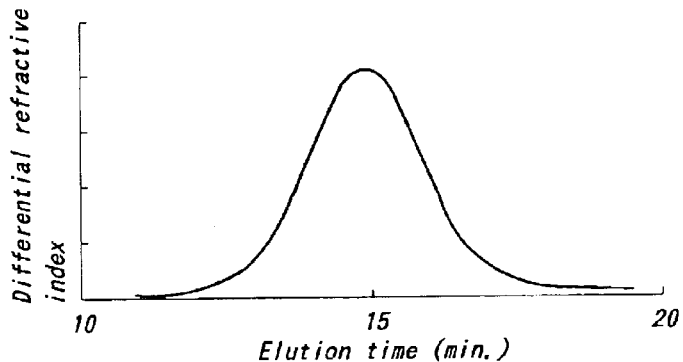
FIG. 4 is a GPC chart of a polymer obtained in Example 7 after modification.
Figure 4B:
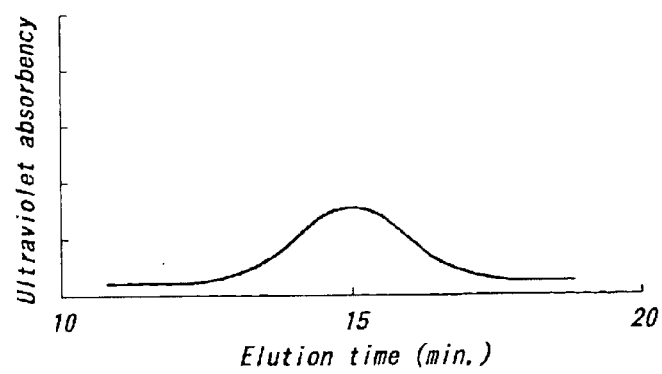

And also, a GPC chart of a polymer before the addition of 2,3-dichloro-1,4-naphthoquinone is shown in FIG. 3 and a GPC chart of a polymer after the addition is shown in FIG. 4. As seen from FIGS. 3 and 4, a peak is not observed by the ultraviolet visible meter before the addition of 2,3-dichloro-1,4-naphthoquinone, but a peak is observed after the addition. This shows that the polymer is modified with 2,3-dichloro-1,4-naphthoquinone.

EXAMPLE 8

A polymer is obtained in the same manner as in Example 7 except that 2-(4-morpholinodithio) benzothiazole is used instead of 2,3-dichloro-1,4-naphthoquinone. The polymerization conditions and analytical results are shown in Table 1.

EXAMPLE 9

A polymer is obtained in the same manner as in Example 7 except that N-oxydiethylene-2-benzothiazole sulfenamide is used instead of 2,3-dichloro-1,4-naphthoquinone. The polymerization conditions and analytical results are shown in Table 1.

EXAMPLE 10

A polymer is obtained in the same manner as in Example 7 except that diethyldithiocarbamic acid 2-benzothiazoyl ester is used instead of 2,3-dichloro-1,4-naphthoquinone. The polymerization conditions and analytical results are shown in Table 1.

EXAMPLE 11

A polymer is obtained in the same manner as in Example 7 except that tetramethylthiuram disulfide is used instead of 2,3-dichloro-1,4-naphthoquinone. The polymerization conditions and analytical results are shown in Table 1.

EXAMPLE 12

A polymer is obtained in the same manner as in Example 7 except that N-(cyclohexylthio) phthalimide is used instead of 2,3-dichloro-1,4-naphthoquinone. The polymerization conditions and analytical results are shown in Table 1.

Comparative Example 1

Into an autoclave of 5 liter in capacity purged with nitrogen are charged 2.4 kg of cyclohexane and 300 g of 1,3-butadiene in a nitrogen atmosphere. Into the resulting mixture is charged a catalyst obtained by previously mixing a cyclohexane solution of neodymium versatate (0.09 mmol), a toluene solution of methylaluminoxane (7.2 mmol), hydrogenated diisobutylaluminum (3.6 mmol) and a toluene solution of diethylaluminum chloride (0.18 mmol) and maturating them with an amount of 1,3-butadiene corresponding to 5 times of neodymium amount at 50° C. for 30 minutes to conduct polymerization at 80° C. for 60 minutes. The reaction conversion of 1,3-butadiene is approximately 100%.

Thereafter, a methanol solution containing 1.5 g of 2,4-di-t-butyl-p-cresol is added to stop polymerization, which is desolvated by steam stripping and dried on a roll at 110° C. to obtain a polymer. The polymerization conditions and analytical results are shown in Table 1.

Comparative Example 2

A polymer is obtained in the same manner as in Example 1 except that dioctyltin bisbenzylmaleate is used instead of 2,3-dichloro-1,4-naphthoquinone. The polymerization conditions and analytical results are shown in Table 1.

Figure 5A:
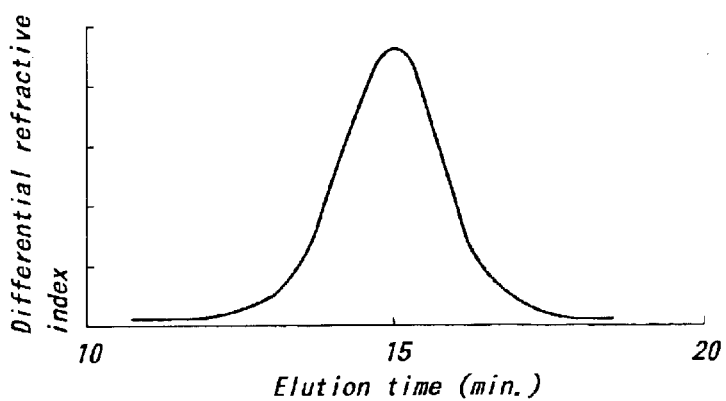
FIG. 5 is a GPC chart of a polymer obtained in Comparative Example 2 before modification.
Figure 5B:
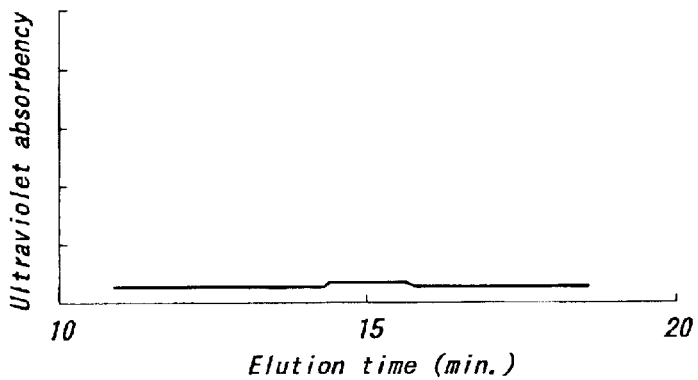
Figure 6A:
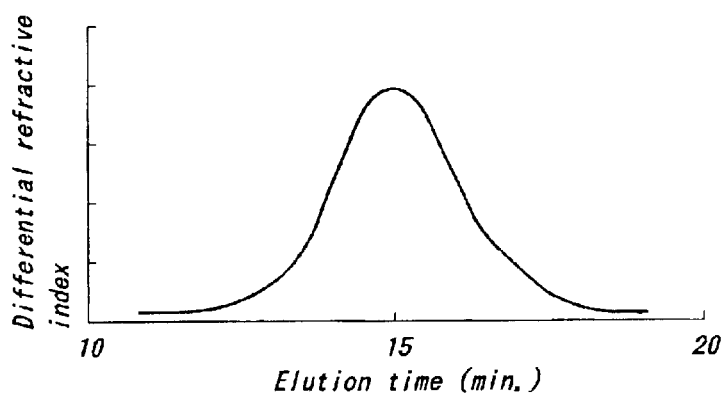
FIG. 6 is a GPC chart of a polymer obtained in Comparative Example 2 after modification.
Figure 6B:
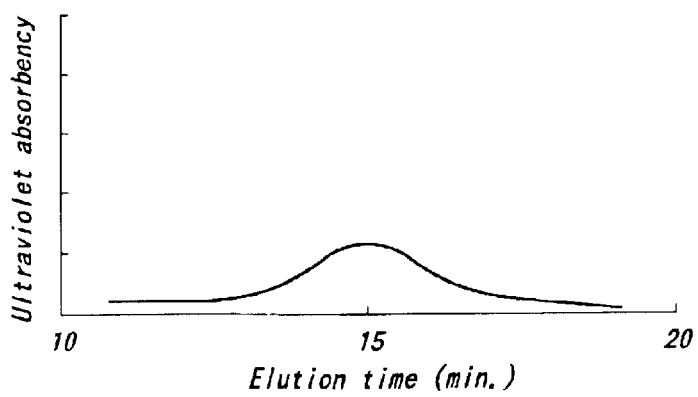

And also, a GPC chart of a polymer before the addition of dioctyltin bisbenzylmaleate is shown in FIG. 5 and a GPC chart of a polymer after the addition is shown in FIG. 6. As seen from FIGS. 5 and 6, a peak is not observed by the ultraviolet visible meter before the addition of dioctyltin bisbenzylmaleate, but a peak is observed after the addition. This shows that the polymer is modified even if the modifying agent is changed.

Comparative Example 3

Into an autoclave of 5 liter in capacity purged with nitrogen are charged 2.4 kg of cyclohexane and 300 g of 1,3-butadiene in a nitrogen atmosphere. Into the resulting mixture is charged a catalyst obtained by previously mixing a cyclohexane solution of neodymium versatate (0.37 mmol), a toluene solution of triisobutylaluminum (11.1 mmol), hydrogenated diisobutylaluminum (3.6 mmol) and a toluene solution of diethylaluminum chloride (0.74 mmol) and maturating them with an amount of 1,3-butadiene corresponding to 5 times of neodymium amount at 50° C. for 30 minutes to conduct polymerization at 80° C. for 60 minutes. The reaction conversion of 1,3-butadiene is approximately 100%.

Thereafter, a methanol solution containing 1.5 g of 2,4-di-t-butyl-p-cresol is added to stop polymerization, which is desolvated by steam stripping and dried on a roll at 110° C. to obtain a polymer. The polymerization conditions and analytical results are shown in Table 1.

Comparative Example 4

A polymer is obtained in the same manner as in Example 7 except that dioctyltin bisbenzylmaleate is used instead of 2,3-dichloro-1,4-naphthoquinone. The polymerization conditions and analytical results are shown in Table 1.

Comparative Example 5

Vulcanization properties of a commercially available polybutadiene rubber (polybutadiene BR01, made by JSR Corporation) are shown in Table 1.

Each polymer of Examples 1–12 and Comparative Examples 1–5 is used and kneaded according to the following compounding recipe in a plastomill. The resulting mass is vulcanized under pressure at 145° C. for an optimum time to obtain a specimen of a vulcanizate. The properties of the resulting vulcanizate are also shown in Table 1.

| Compounding recipe | (parts) |
| --- | --- |
| rubber ingredient | 100 |
| carbon black HAF | 50 |
| zinc white | 3 |
| stearic acid | 2 |
| antioxidant (*1) | 1 |
| vulcanization accelerator (*2) | 0.8 |
| sulfur | 1.5 |

(*1) N-isopropyl-N'-phenyl-p-phenylene diamine
(*2) N-cyclohexyl-2-benzothiazyl sulfenamide

TABLE 1

| | Rare earth element containing compound (mmol) | Aluminoxane or organoaluminum compound (mmol) | | Halogen containing compound (mmol) | Modifying agent (mmol) |
| --- | --- | --- | --- | --- | --- |
| Example 1 | Nd(ver)$_3$ (0.09) | MAO (7.2) | AliBu$_2$H (3.6) | DEAC (0.18) | 2,3-dichloro-1,4-naphthoquinone (4.5) |
| Example 2 | Nd(ver)$_3$ (0.09) | MAO (7.2) | AliBu$_2$H (3.6) | DEAC (0.18) | 2-(4-morpholinodithio) benzothiazole (4.5) |
| Example 3 | Nd(ver)$_3$ (0.09) | MAO (7.2) | AliBu$_2$H (3.6) | DEAC (0.18) | N-oxydiethylene-2-benzothiazole sulfemamide (4.5) |
| Example 4 | Nd(ver)$_3$ (0.09) | MAO (7.2) | AliBu$_2$H (3.6) | DEAC (0.18) | diethyldithiocarbamic acid 2-benzothiazoyl ester (4.5) |
| Example 5 | Nd(ver)$_3$ (0.09) | MAO (7.2) | AliBu$_2$H (3.6) | DEAC (0.18) | tetramethylthiuram disulfide (4.5) |
| Example 6 | Nd(ver)$_3$ (0.09) | MAO (7.2) | AliBu$_2$H (3.6) | DEAC (0.18) | N-(cyclohexylthio) phathalimide (4.5) |
| Example 7 | Nd(ver)$_3$ (0.37) | AliBu$_3$ (11.1) | AliBu$_2$H (3.6) | DEAC (0.74) | 2,3-dichloro-1,4-naphthoquinone (4.5) |
| Example 8 | Nd(ver)$_3$ (0.37) | AliBu$_3$ (11.1) | AliBu$_2$H (3.6) | DEAC (0.74) | 2-(4-morpholinodithio) benzothiazole (4.5) |
| Example 9 | Nd(ver)$_3$ (0.37) | AliBu$_3$ (11.1) | AliBu$_2$H (3.6) | DEAC (0.74) | N-oxydiethylene-2-benzothiazole sulfemamide (4.5) |
| Example 10 | Nd(ver)$_3$ (0.37) | AliBu$_3$ (11.1) | AliBu$_2$H (3.6) | DEAC (0.74) | diethyldithiocarbamic acid 2-benzothiazoyl ester (4.5) |
| Example 11 | Nd(ver)$_3$ (0.37) | AliBu$_3$ (11.1) | AliBu$_2$H (3.6) | DEAC (0.74) | tetramethylthiura disulfide (4.5) |
| Example 12 | Nd(ver)$_3$ (0.37) | AliBu$_3$ (11.1) | AliBu$_2$H (3.6) | DEAC (0.74) | N-(cyclohexylthio) phathalimide (4.5) |

TABLE 1-continued

| | | | | | |
|---|---|---|---|---|---|
| Comparative Example 1 | Nd(ver)₃ (0.09) | MAO (7.2) | AliBu₂H (3.6) | DEAC (0.18) | — |
| Comparative Example 2 | Nd(ver)₃ (0.09) | MAO (7.2) | AliBu₂H (3.6) | DEAC (0.18) | dioctyltin bisbenzyl maleate (4.5) |
| Comparative Example 3 | Nd(ver)₃ (0.37) | AliBu₃ (11.1) | AliBu₂H (3.6) | DEAC (0.74) | — |
| Comparative Example 4 | Nd(ver)₃ (0.37) | AliBu₃ (11.1) | AliBu₂H (3.6) | DEAC (0.74) | dioctyltin bisbenzyl maleate (4.5) |
| Comparative Example 5(*4) | — | — | — | — | — |

| | Polymerization results | | | | | | Vulcanization properties | | | |
|---|---|---|---|---|---|---|---|---|---|---|
| | Polymerizing temperature (°C.) | Polymerizing time (h) | Yield of polymer (g) | Mooney viscosity | Mw/Mn (*1) | Cis-1,4- bond content (%) | 1,2-vinyl bond content (%) | TB (MPa) | EB (%) | tan δ 50° C. index(*2) | Wear resistance index(*3) |
| Example 1 | 80 | 1 | 290 | 36 | 2.7 | 97.1 | 1.1 | 22.8 | 580 | 125 | 141 |
| Example 2 | 80 | 1 | 290 | 31 | 2.6 | 96.8 | 1.2 | 23.1 | 570 | 124 | 132 |
| Example 3 | 80 | 1 | 290 | 30 | 2.6 | 97.2 | 0.9 | 22.6 | 550 | 137 | 126 |
| Example 4 | 80 | 1 | 285 | 30 | 2.8 | 96.9 | 1.0 | 23.7 | 565 | 125 | 132 |
| Example 5 | 80 | 1 | 290 | 33 | 2.7 | 96.4 | 1.1 | 23.5 | 560 | 126 | 143 |
| Example 6 | 80 | 1 | 290 | 31 | 2.4 | 96.2 | 1.1 | 23.5 | 585 | 134 | 133 |
| Example 7 | 80 | 1 | 285 | 35 | 2.5 | 95.9 | 1.1 | 22.8 | 570 | 129 | 124 |
| Example 8 | 80 | 1 | 290 | 33 | 2.4 | 96.4 | 1.3 | 22.9 | 580 | 116 | 138 |
| Example 9 | 80 | 1 | 290 | 33 | 2.3 | 96.3 | 1.2 | 22.9 | 575 | 130 | 125 |
| Example 10 | 80 | 1 | 285 | 32 | 2.4 | 96.7 | 1.2 | 23.4 | 550 | 119 | 133 |
| Example 11 | 80 | 1 | 285 | 34 | 2.3 | 96.5 | 1.1 | 23.1 | 555 | 121 | 128 |
| Example 12 | 80 | 1 | 290 | 32 | 2.2 | 96.1 | 1.3 | 22.9 | 545 | 121 | 132 |
| Comparative Example 1 | 80 | 1 | 290 | 29 | 2.5 | 96.2 | 1.3 | 19.6 | 565 | 113 | 119 |
| Comparative Example 2 | 80 | 1 | 290 | 38 | 2.8 | 96.7 | 1.2 | 20.1 | 570 | 115 | 117 |
| Comparative Example 3 | 80 | 1 | 290 | 33 | 2.3 | 96.4 | 1.1 | 19.2 | 545 | 114 | 112 |
| Comparative Example 4 | 80 | 1 | 285 | 37 | 2.5 | 96.4 | 1.1 | 19.1 | 560 | 111 | 116 |
| Comparative Example 5(*4) | — | — | — | 45 | 4.0 | 95.0 | 2.5 | 16.6 | 535 | 100 | 100 |

(*1) ratio of weight average molecular weight (Mw) to number average molecular weight (Mn)
(*2) represented by an index on the basis that Comparative Example 5 is 100, wherein the larger the index value, the better the property
(*3) represented by an index on the basis that Comparative Example 5 is 100, wherein the larger the index value, the better the property
(*4) commercially available BR (JSR BR01) made by JSR Corporation As seen from Table 1, the breaking strength, rebound resilience and wear resistance after the vulcanization in Examples 1–6 are improved as compared with those of Comparative Example 1. And also, it is understood from Comparative Example 2 that each property after the vulcanization is excellent as compared with that of the polymer modified with the well-known modifying agent.

Similarly, the breaking strength, rebound resilience and wear resistance after the vulcanization in Examples 7–12 are improved as compared with those of Comparative Examples 3 and 4, from which it is understood that the properties after the vulcanization are improved by using the above modifying agents irrespectively of the catalyst composition.

From the above results, it is apparent that the modifying agents as defined in the invention are very useful.

EXAMPLES 13–24

Comparative Examples 6–18

Each polymer of Examples 1–3 and 10–12 and Comparative Examples 1, 4 and 5 is blended with natural rubber and kneaded according to the following compounding recipe in a plastomill. The resulting mass is vulcanized under pressure at 145° C. for an optimum time to obtain a specimen of a vulcanizate. The properties of the resulting vulcanizate are shown in Tables 2–3.

| Compounding recipe | (parts) |
|---|---|
| rubber ingredient (*1) | 100 |
| carbon black HAF | 50 |
| zinc white | 3 |
| stearic acid | 2 |
| antioxidant (*2) | 1 |
| vulcanization accelerator (*3) | 0.8 |
| sulfur | 1.5 |

(*1) blending ratio is shown in Tables 2 and 3
(*2) N-isopropyl-N'-phenyl-p-phenylene diamine
(*3) N-cyclohexyl-2-benzothiazyl sulfenamide

TABLE 2

| | Example 13 | Example 14 | Comparative Example 6 | Example 15 | Example 16 | Comparative Example 7 | Example 17 | Example 18 | Comparative Example 8 | Example 19 | Example 20 | Comparative Example 9 |
|---|---|---|---|---|---|---|---|---|---|---|---|---|
| Kind of polymer (part) | | | | | | | | | | | | |
| Example 1 | 60 | 30 | 5 | — | — | — | — | — | — | — | — | — |
| Example 2 | — | — | — | 60 | 30 | 5 | — | — | — | — | — | — |
| Example 3 | — | — | — | — | — | — | 60 | 30 | 5 | — | — | — |
| Example 10 | — | — | — | — | — | — | — | — | — | 60 | 30 | 5 |
| Example 11 | — | — | — | — | — | — | — | — | — | — | — | — |
| Example 12 | — | — | — | — | — | — | — | — | — | — | — | — |
| Comparative Example 1 | — | — | — | — | — | — | — | — | — | — | — | — |
| Comparative Example 4 | — | — | — | — | — | — | — | — | — | — | — | — |
| Comparative Example 5(*1) | — | — | — | — | — | — | — | — | — | — | — | — |
| natural rubber | 40 | 70 | 95 | 40 | 70 | 95 | 40 | 70 | 95 | 40 | 70 | 95 |
| Vulcanization properties | | | | | | | | | | | | |
| Tensile properties M 300% (MPa) | 14.2 | 15.4 | 16.3 | 14.5 | 15.3 | 15.9 | 13.8 | 14.8 | 15.3 | 14.1 | 14.9 | 16.1 |
| TB (MPa) | 27.5 | 28.9 | 29.7 | 24.1 | 26.1 | 27.1 | 27.3 | 28.7 | 29.5 | 26.8 | 28.2 | 28.3 |
| EB (%) | 505 | 500 | 520 | 480 | 490 | 480 | 490 | 485 | 440 | 495 | 505 | 510 |
| Lambourn abrasion test Index(*2) | 121 | 114 | 102 | 118 | 109 | 97 | 123 | 124 | 94 | 114 | 110 | 96 |
| Tan δ (50° C.) Index(*3) | 115 | 110 | 99 | 120 | 112 | 104 | 118 | 110 | 97 | 122 | 120 | 100 |

(*1)commercially available BR (JSR BR01) made by JSR Corporation
(*2)represented by an index on the basis that Comparative Example 18 is 100, wherein the larger the index value, the better the property
(*3)represented by an index on the basis that Comparative Example 18 is 100, wherein the larger the index value, the better the property

TABLE 3

| | Example 21 | Example 22 | Comparative Example 10 | Example 23 | Example 24 | Comparative Example 11 | Comparative Example 12 | Comparative Example 13 | Comparative Example 14 | Comparative Example 15 | Comparative Example 16 | Comparative Example 17 | Comparative Example 18 |
|---|---|---|---|---|---|---|---|---|---|---|---|---|---|
| Kind of polymer (part) | | | | | | | | | | | | | |
| Example 1 | — | — | — | — | — | — | — | — | — | — | — | — | — |
| Example 2 | — | — | — | — | — | — | — | — | — | — | — | — | — |
| Example 3 | — | — | — | — | — | — | — | — | — | — | — | — | — |
| Example 10 | — | — | — | — | — | — | — | — | — | — | — | — | — |
| Example 11 | 60 | 30 | 5 | — | — | — | — | — | — | — | — | — | — |
| Example 12 | — | — | — | 60 | 30 | 5 | — | — | — | — | — | — | — |
| Comparative Example 1 | — | — | — | — | — | — | 60 | 30 | 5 | — | — | — | — |
| Comparative Example 4 | — | — | — | — | — | — | — | — | — | 60 | 30 | 5 | — |
| Comparative Example 5(*1) | — | — | — | — | — | — | — | — | — | — | — | — | 60 |
| natural rubber | 40 | 70 | 95 | 40 | 70 | 95 | 40 | 70 | 95 | 40 | 70 | 95 | 40 |
| Vulcanization properties | | | | | | | | | | | | | |
| Tensile properties M 300% (MPa) | 13.9 | 14.5 | 17.0 | 14.7 | 15.8 | 16.2 | 13.7 | 14.8 | 15.5 | 14.0 | 15.1 | 16.7 | 13.0 |
| TB (MPa) | 25.8 | 27.5 | 27.4 | 24.8 | 26.1 | 27.8 | 27.0 | 27.6 | 27.6 | 26.8 | 27.4 | 27.9 | 26.0 |
| EB (%) | 515 | 510 | 520 | 475 | 485 | 495 | 515 | 505 | 515 | 495 | 510 | 480 | 525 |
| Lambourn abrasion test Index(*2) | 120 | 116 | 97 | 119 | 120 | 98 | 106 | 105 | 98 | 109 | 106 | 99 | 100 |

TABLE 3-continued

|  | Example 21 | Example 22 | Comparative Example 10 | Example 23 | Example 24 | Comparative Example 11 | Comparative Example 12 | Comparative Example 13 | Comparative Example 14 | Comparative Example 15 | Comparative Example 16 | Comparative Example 17 | Comparative Example 18 |
|---|---|---|---|---|---|---|---|---|---|---|---|---|---|
| Tan δ (50° C.) Index(*3) | 119 | 110 | 99 | 115 | 110 | 95 | 110 | 102 | 94 | 104 | 101 | 89 | 100 |

(*1)commercially available BR (JSR BR01) made by JSR Corporation
(*2)represented by an index on the basis that Comparative Example 18 is 100, wherein the larger the index value, the better the property
(*3)represented by an index on the basis that Comparative Example 18 is 100, wherein the larger the index value, the better the property As seen from Tables 2 and 3, the breaking strength, rebound resilience and wear resistance after the vulcanization in Examples 13–24 are improved as compared with those of Comparative Examples 12, 13, 15, 16 and 18, from which it is apparent that the properties are improved by using the polymer according to the invention even when being blended with natural rubber. However, it is apparent from Comparative Examples 6–11, 14 and 17 that the sufficient effect of improving the properties is not obtained when the amount of the polymer according to the invention is too small per 100% by weight in total of rubber ingredient.

EXAMPLES 25–30

Comparative Examples 19–21

Each polymer of Examples 1–3 and 10–12 and Comparative Examples 1, 4 and 5 is blended with solution-polymerized SBR and kneaded according to the following compounding recipe in a plastomill. The resulting mass is vulcanized under pressure at 145° C. for an optimum time to obtain a specimen of a vulcanizate. The properties of the resulting vulcanizate are shown in Table 4.

| Compounding recipe | (parts) |
|---|---|
| rubber ingredient (*1) | 100 |
| carbon black HAF | 50 |
| zinc white | 3 |
| stearic acid | 2 |
| antioxidant (*2) | 1 |
| vulcanization accelerator (*3) | 0.8 |
| sulfur | 1.5 |

(*1) blending ratio is shown in Table 4
(*2) N-isopropyl-N'-phenyl-p-phenylene diamine
(*3) N-cyclohexyl-2-benzothiazyl sulfenamide

TABLE 4

|  |  | Example 25 | Example 26 | Example 27 | Example 28 | Example 29 | Example 30 | Comparative Example 19 | Comparative Example 20 | Comparative Example 21 |
|---|---|---|---|---|---|---|---|---|---|---|
| Kind of polymer (part) | Example 1 | 50 | — | — | — | — | — | — | — | — |
|  | Example 2 | — | 50 | — | — | — | — | — | — | — |
|  | Example 3 | — | — | 50 | — | — | — | — | — | — |
|  | Example 10 | — | — | — | 50 | — | — | — | — | — |
|  | Example 11 | — | — | — | — | 50 | — | — | — | — |
|  | Example 12 | — | — | — | — | — | 50 | — | — | — |
|  | Comparative Example 1 | — | — | — | — | — | — | 50 | — | — |
|  | Comparative Example 4 | — | — | — | — | — | — | — | 50 | — |
|  | Comparative Example 5 (*1) | — | — | — | — | — | — | — | — | 50 |
|  | SBR(*2) | 50 | 50 | 50 | 50 | 50 | 50 | 50 | 50 | 50 |
|  | natural rubber | — | — | — | — | — | — | — | — | — |
| Vulcanization properties | Tensile properties M 300% (MPa) | 13.7 | 13.9 | 14.1 | 13.5 | 13.8 | 13.5 | 12.5 | 11.8 | 11.9 |
|  | TB (MPa) | 23.7 | 22.7 | 24.3 | 23.8 | 22.9 | 24.1 | 21.1 | 21.8 | 20.7 |
|  | EB (%) | 395 | 400 | 385 | 400 | 420 | 375 | 410 | 405 | 400 |
|  | Lambourn abrasion test Index(*3) | 112 | 124 | 115 | 119 | 121 | 117 | 105 | 108 | 100 |
|  | Tan δ (50° C.) Index(*4) | 118 | 110 | 122 | 116 | 118 | 123 | 109 | 101 | 100 |

(*1)commercially available BR (JSR BR01) made by JSR Corporation
(*2)styrene-butadiene rubber having a bound styrene content of 35% and a vinyl bond content of 21% and modified with tin tetrachloride
(*3)represented by an index on the basis that Comparative Example 21 is 100, wherein the larger the index value, the better the property
(*4)represented by an index on the basis that Comparative Example 21 is 100, wherein the larger the index value, the better the property As seen from Table 4, the breaking strength, rebound resilience and ear resistance after the vulcanization in Examples 25–30 are improved as compared with those of Comparative Examples 19–21, from which it is apparent that the properties are improved by using the polymer according to the invention even when being blended with the solution-polymerized SBR.

EXAMPLES 31–33

Comparative Examples 22–23

The polymer of Example 1 is blended with natural rubber and kneaded according to the following compounding recipe in a plastomill. The resulting mass is vulcanized under pressure at 145° C. for an optimum time to obtain a specimen of a vulcanizate. The properties of the resulting vulcanizate are shown in Table 5.

| Compounding recipe | (parts) |
|---|---|
| rubber ingredient (*1) | 100 |
| carbon black HAF | 10–130 |
| zinc white | 3 |
| stearic acid | 2 |
| antioxidant (*2) | 1 |
| vulcanization accelerator (*3) | 0.8 |
| sulfur | 1.5 |

(*1) blending ratio is shown in Table 5
(*2) N-isopropyl-N'-phenyl-p-phenylene diamine
(*3) N-cyclohexyl-2-benzothiazyl sulfenamide

TABLE 5

| | | Example | | | Comparative Example | |
|---|---|---|---|---|---|---|
| | | 31 | 32 | 33 | 22 | 23 |
| Rubber ingredient (part) | Example 1 | 60 | 60 | 60 | 60 | 60 |
| | natural rubber | 40 | 40 | 40 | 40 | 40 |
| Carbon black | | 100 | 60 | 30 | 130 | 10 |
| Vulcanization properties | Tensile properties | | | | | |
| | M 300% (MPa) | 14.8 | 14.2 | 12.8 | 9.8 | 10.4 |
| | TB (MPa) | 27.9 | 27.5 | 25.1 | 19.2 | 17.8 |
| | EB (%) | 480 | 505 | 510 | 310 | 480 |
| | Lambourn abrasion test Index (*1) | 117 | 121 | 111 | 89 | 78 |
| | Tan δ (50° C.) Index (*2) | 119 | 115 | 109 | 94 | 86 |

(*1) represented by an index on the basis that Comparative Example 18 is 100, wherein the larger the index value, the better the property
(*2) represented by an index on the basis that Comparative Example 18 is 100, wherein the larger the index value, the better the property As seen from Table 5, the breaking strength, rebound resilience and wear resistance after the vulcanization in Examples 31–33 are improved as compared with those of Comparative Examples 22–23, from which it is apparent that the sufficient effect of improving the properties is not obtained when the amount of carbon black added in the compounding is too large or too small.

EXAMPLE 34

Into an autoclave of 5 liter in capacity purged with nitrogen are charged 2.4 kg of cyclohexane and 300 g of 1,3-butadiene in a nitrogen atmosphere. Into the resulting mixture is charged a catalyst obtained by previously mixing a cyclohexane solution of neodymium versatate (0.09 mmol), a toluene solution of methylaluminoxane (7.2 mmol), hydrogenated diisobutylaluminum (3.6 mmol) and a toluene solution of a diethylaluminum chloride (0.18 mmol) as a catalyst component and maturating them with an amount of 1,3-butadiene corresponding to 5 times of neodymium amount at 50° C. for 30 minutes to conduct polymerization at 80° C. for 60 minutes. The reaction conversion of 1,3-butadiene is approximately 100%.

In order to measure a Mooney viscosity, a part of the resulting polymer solution is taken out, solidified and dried. Such a polymer has a cis-1,4-bond content of 95.5%, a vinyl bond content of 1.4% and a ratio Mw/Mn of 2.7.

Then, the polymer solution is kept at a temperature of 50° C. and added and reacted with N,N-diglycidylaniline (GAN, made by Nippon Kayaku Co., Lt.) (4.5 mmol) for 30 minutes. Thereafter, a methanol solution containing 1.5 g of 2,4-di-t-butyl-p-cresol is added to stop polymerization, which is desolvated by steam stripping and dried on a roll at 110° C. to obtain a polymer. The polymerization conditions and analytical results are shown in Table 6.

EXAMPLE 35

A polymer is obtained in the same manner as in Example 34 except that silicon tetrachloride is used instead of diethylaluminum chloride. The polymerization conditions and analytical results are shown in Table 6.

EXAMPLE 36

A polymer is obtained in the same manner as in Example 34 except that a complex of zinc chloride and tricresyl phosphate is used instead of diethylaluminum chloride. The polymerization conditions and analytical results are shown in Table 6.

EXAMPLE 37

A polymer is obtained in the same manner as in Example 34 except that a complex of zinc chloride and 1-decanol is used instead of diethylaluminum chloride. The polymerization conditions and analytical results are shown in Table 6.

EXAMPLE 38

A polymer is obtained in the same manner as in Example 37 except that N-phenyl maleimide is used instead of N,N-diglycidylaniline. The polymerization conditions and analytical results are shown in Table 6.

Figure 7A:
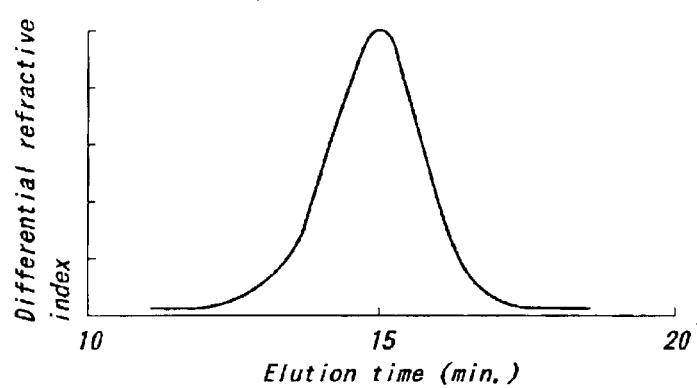
FIG. 7 is a GPC chart of a polymer obtained in Example 38 before modification.
Figure 7B:
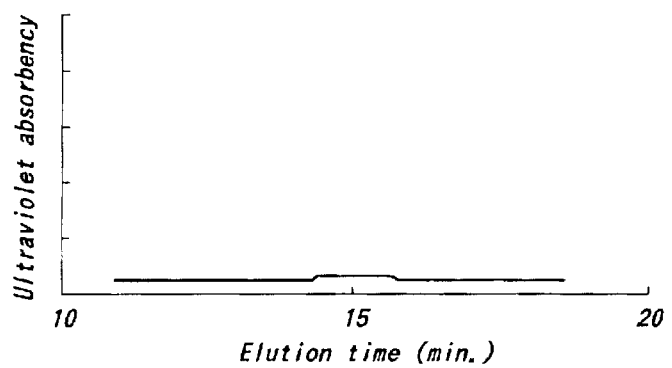
Figure 8A:
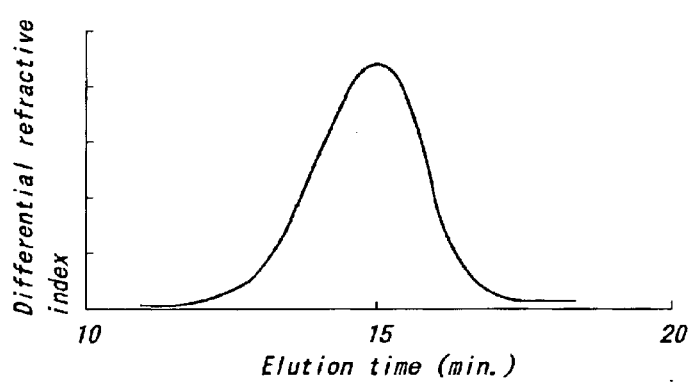
FIG. 8 is a GPC chart of a polymer obtained in Example 38 after modification.
Figure 8B:
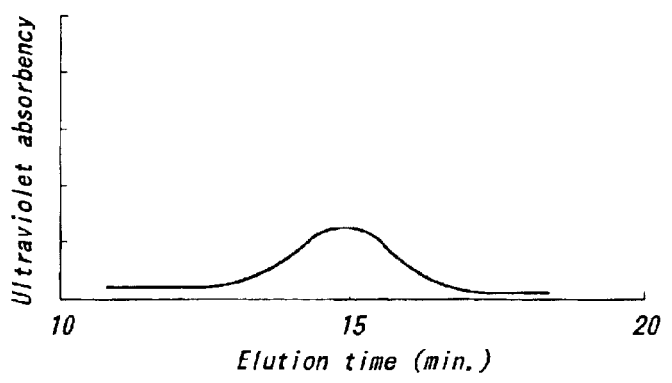

And also, a GPC chart of a polymer before the addition of N-phenyl maleimide is shown in FIG. 7 and a GPC chart of a polymer after the addition is shown in FIG. 8. As seen from FIGS. 7 and 8, a peak is not observed by the ultraviolet visible meter before the addition of 2,3-dichloro-1,4-naphthoquinone, but a peak is observed after the addition. This shows that the polymer is modified even when the modifying agent is changed.

EXAMPLE 39

A polymer is obtained in the same manner as in Example 37 except that dimethylamino benzaldehyde is used instead of N,N-diglycidylaniline. The polymerization conditions and analytical results are shown in Table 6.

Comparative Example 24

Into an autoclave of 5 liter in capacity purged with nitrogen are charged 2.4 kg of cyclohexane and 300 g of 1,3-butadiene in a nitrogen atmosphere. Into the resulting mixture is charged a catalyst obtained by previously mixing a cyclohexane solution of neodymium versatate (0.09 mmol), a toluene solution of methylaluminoxane (7.2 mmol), hydrogenated diisobutylaluminum (3.6 mmol) and a toluene solution of diethylaluminum chloride (0.18 mmol) and maturating them with an amount of 1,3-butadiene corresponding to 5 times of neodymium amount at 50° C. for 30 minutes to conduct polymerization at 80° C. for 60 minutes. The reaction conversion of 1,3-butadiene is approximately 100%.

Thereafter, a methanol solution containing 1.5 g of 2,4-di-t-butyl-p-cresol is added to stop polymerization, which is desolvated by steam stripping and dried on a roll at 110° C. to obtain a polymer. The polymerization conditions and analytical results are shown in Table 7.

Comparative Example 25

A polymer is obtained in the same manner as in Comparative Example 24 except that silicon tetrachloride is used instead of diethylaluminum chloride. The polymerization conditions and analytical results are shown in Table 7.

Comparative Example 26

A polymer is obtained in the same manner as in Comparative Example 24 except that a complex of zinc chloride and tricresyl phosphate is used instead of diethylaluminum chloride. The polymerization conditions and analytical results are shown in Table 7.

Comparative Example 27

A polymer is obtained in the same manner as in Comparative Example 24 except that a complex of zinc chloride and 1-decanol is used instead of diethylaluminum chloride. The polymerization conditions and analytical results are shown in Table 7.

Comparative Example 28

A polymer is obtained in the same manner as in Comparative Example 27 except that an epoxidized soybean oil is used instead of N,N-diglycidylaniline. The polymerization conditions and analytical results are shown in Table 7.

Comparative Example 29

A polymer is obtained in the same manner as in Comparative Example 27 except that dioctyltin bisbenzylmaleate is used instead of N,N-diglycidylaniline. The polymerization conditions and analytical results are shown in Table 7.

Comparative Example 30

Vulcanization properties of a commercially available polybutadiene rubber (polybutadiene BR01, made by JSR Corporation) are shown in Table 7.

Each polymer of Examples 34–39 and Comparative Examples 24–29 is used and kneaded according to the following compounding recipe in a plastomill. The resulting mass is vulcanized under pressure at 145° C. for an optimum time to obtain a specimen of a vulcanizate. The properties of the resulting vulcanizate are shown in Tables 6 and 7.

| Compounding recipe | (parts) |
|---|---|
| polymer | 50 |
| natural rubber | 50 |
| carbon black ISAF | 50 |
| zinc white | 3 |
| stearic acid | 2 |
| antioxidant (*1) | 1 |
| vulcanization accelerator (*2) | 0.8 |
| sulfur | 1.5 |

(*1) N-isopropyl-N'-phenyl-p-phenylene diamine
(*2) N-cyclohexyl-2-benzothiazyl sulfenamide

TABLE 6

| | Catalyst system | | | | |
|---|---|---|---|---|---|
| | Rare earth element containing compound (mmol) | Aluminoxane (mmol) | Organoaluminum compound (mmol) | Halogen containing compound (mmol) | Modifying agent (mmol) |
| Example 34 | Nd(ver)$_3$ (0.09) | MAO (7.2) | AliBu$_2$H (3.6) | DEAC (0.18) | GAN (4.5) |
| Example 35 | Nd(ver)$_3$ (0.09) | MAO (7.2) | AliBu$_2$H (3.6) | SiCl$_4$ (0.18) | GAN (4.5) |
| Example 36 | Nd(ver)$_3$ (0.09) | MAO (7.2) | AliBu$_2$H (3.6) | ZnCl$_2$/tricresyl phosphate (0.09) | GAN (4.5) |
| Example 37 | Nd(ver)$_3$ (0.37) | MAO (7.2) | AliBu$_2$H (3.6) | ZnCl$_2$/1-decanol (0.09) | GAN (4.5) |
| Example 38 | Nd(ver)$_3$ (0.09) | MAO (7.2) | AliBu$_2$H (3.6) | ZnCl$_2$/1-decanol (0.09) | N-phenyl maleimide (4.5) |
| Example 39 | Nd(ver)$_3$ (0.37) | MAO (7.2) | AliBu$_2$H (3.6) | ZnCl$_2$/1-decanol (0.09) | dimethylaminobenzaldehyde (4.5) |

| | Polymerization conditions | | Polymerization results | | | | Vulcanization properties | | | |
|---|---|---|---|---|---|---|---|---|---|---|
| | Polymerizing temperature (° C.) | Polymerizing time (h) | Yield of polymer (g) | Mooney viscosity | Molecular weight distribution Mw/Mn (*1) | Cis-1,4-bond content (%) | 1,2-vinyl bond content (%) | TB (MPa) | EB (%) | Rebound resilience (%) | Wear resistance index (*2) |
| Example 34 | 80 | 1 | 290 | 37 | 3.1 | 95.5 | 1.4 | 27.8 | 480 | 76 | 132 |
| Example 35 | 80 | 1 | 290 | 37 | 2.9 | 95.7 | 1.4 | 27.8 | 475 | 77 | 131 |

TABLE 6-continued

| Example 36 | 80 | 1 | 290 | 38 | 2.5 | 96.7 | 1.0 | 27.7 | 475 | 79 | 133 |
| Example 37 | 80 | 1 | 285 | 37 | 2.6 | 96.6 | 0.9 | 27.6 | 480 | 80 | 130 |
| Example 38 | 80 | 1 | 290 | 31 | 2.4 | 96.6 | 1.1 | 27.5 | 485 | 78 | 131 |
| Example 39 | 80 | 1 | 280 | 32 | 2.2 | 96.1 | 1.2 | 27.8 | 470 | 81 | 137 |

(*1) ratio of weight average molecular weight (Mw) to number average molecular weight (Mn)
(*2) represented by an index on the basis that Comparative Example 30 is 100, wherein the larger the index value, the better the property

TABLE 7

| | Catalyst system | | | | |
|---|---|---|---|---|---|
| | Rare earth element containing compound (mmol) | Aluminoxane (mmol) | Organoaluminum compound (mmol) | Halogen containing compound (mmol) | Modifying agent (mmol) |
| Comparative Example 24 | Nd(ver)$_3$ (0.09) | MAO (7.2) | AliBu$_2$H (3.6) | DEAC (0.09) | — |
| Comparative Example 25 | Nd(ver)$_3$ (0.09) | MAO (7.2) | AliBu$_2$H (3.6) | SiCl$_4$ (0.09) | — |
| Comparative Example 26 | Nd(ver)$_3$ (0.09) | MAO (7.2) | AliBu$_2$H (3.6) | ZnCl$_2$/tricresyl phosphate (0.09) | — |
| Comparative Example 27 | Nd(ver)$_3$ (0.37) | AliBu$_3$ (11.1) | AliBu$_2$H (3.7) | ZnCl$_2$/1-decanol (0.09) | — |
| Comparative Example 28 | Nd(ver)$_3$ (0.09) | MAO (7.2) | AliBu$_2$H (3.6) | ZnCl$_2$/1-decanol (0.09) | epoxidized soybean oil (4.5) |
| Comparative Example 29 | Nd(ver)$_3$ (0.09) | MAO (7.2) | AliBu$_2$H (3.6) | ZnCl$_2$/1-decanol (0.09) | DOTBBM (4.5) |
| Comparative Example 30 (*3) | — | — | — | — | — |

| | Polymerization conditions | | Polymerization results | | | | | Vulcanization properties | | | |
|---|---|---|---|---|---|---|---|---|---|---|---|
| | Polymerizing temperature (° C.) | Polymerizing time (h) | Yield of polymer (g) | Mooney viscosity | Molecular weight distribution Mw/Mn (*1) | Cis-1,4- bond content (%) | 1,2-vinyl bond content (%) | TB (MPa) | EB (%) | Rebound resilience (%) | Wear resistance index (*2) |
| Comparative Example 24 | 80 | 1 | 285 | 28 | 2.8 | 95.4 | 1.4 | 26.1 | 500 | 63 | 110 |
| Comparative Example 25 | 80 | 1 | 290 | 27 | 2.7 | 95.6 | 1.4 | 26.2 | 505 | 64 | 112 |
| Comparative Example 26 | 80 | 1 | 290 | 28 | 2.2 | 96.6 | 1.0 | 26.5 | 510 | 67 | 115 |
| Comparative Example 27 | 80 | 1 | 290 | 28 | 2.1 | 96.1 | 1.3 | 26.6 | 500 | 66 | 116 |
| Comparative Example 29 | 80 | 1 | 290 | 36 | 2.4 | 95.6 | 1.4 | 26.9 | 485 | 71 | 123 |
| Comparative Example 29 | 80 | 1 | 290 | 41 | 2.3 | 96.6 | 1.0 | 26.8 | 480 | 73 | 127 |
| Comparative Example 30 (*3) | — | — | — | 45 | 4.0 | 95.0 | 2.5 | 25.4 | 470 | 58 | 100 |

(*1) ratio of weight average molecular weight (Mw) to number average molecular weight (Mn)
(*2) represented by an index on the basis that Comparative Example 30 is 100, wherein the larger the index value, the better the property
(*3) commercially available BR (JSR BR01) made by JSR Corporation As seen from Tables 6 and 7, the breaking strength, rebound resilience and wear resistance after the vulcanization in Examples 37–39 are improved as compared with those of Comparative Example 27. And also, it is understood from Comparative Examples 28–29 that each property after the vulcanization is excellent as compared with that of the polymer modified with the well-known modifying agent. Furthermore, it is understood from Examples 34–37 and Comparative Examples 24–27 that the modifying agents as defined in the invention are very useful irrespectively of the halogen containing compounds to be used in the polymerization.

Since the modified conjugated diene polymers according to the invention are obtained by modifying (or coupling) with the compound having the specified functional group, they are excellent in the dispersibility of carbon black as a rubber reinforcement and provide vulcanized rubber having excellent rebound resilience, wear resistance and mechanical strength.

What is claimed is:

1. A terminal-modified conjugated diene polymer obtained by modifying or coupling a conjugated diene polymer with at least one compound selected from the group consisting of the following components (d), (e), and (f), and having a content of cis-1,4-bond in a conjugated diene portion of not less than 85% and a ratio of weight average molecular weight (Mw) to number average molecular weight (Mn) of not more than 4 as measured through a gel permeation chromatography:

Component (d): a quinone compound;

Component (e): a thiazole compound; and

Component (f): a sulfenamide compound.

2. A terminal-modified conjugated diene polymer according to claim 1, wherein said ratio (Mw/Mn) is not more than 3.5.

3. A terminal-modified conjugated diene polymer according to claim 1, wherein said polymer has a content of 1,2-vinyl bond of not more than 2.5%.

4. A rubber composition comprising 20–120 parts by weight of carbon black based on 100 parts by weight of rubber ingredient consisting of 10–100% by weight of a terminal-modified conjugated diene polymer as claimed in any one of claims 1 and 2 to 3 and 90–0% by weight of at least one other rubber selected from the group consisting of natural rubber, synthetic isoprene rubber, butadiene rubber, styrene-butadiene rubber, ethylene-α-olefin copolymer rubber, ethylene-α-olefin-diene terpolymer rubber, acrylonitrile-butadiene copolymer rubber, chloroprene rubber and halogenated butyl rubber (provided that the modified conjugated diene rubber+the other rubber=100% by weight).

* * * * *